US012562465B2

(12) United States Patent
Moss et al.

(10) Patent No.: US 12,562,465 B2
(45) Date of Patent: Feb. 24, 2026

(54) VEHICLE RADAR SENSOR UNIT WITH INCREASED VERTICAL RESOLUTION

(71) Applicant: Veoneer Sweden AB, Värgärda (SE)

(72) Inventors: Jonathan Moss, Unterschleissheim (DE); Krishna Kant Nainwal, Unterschleissheim (DE); Hansjerg Goelz, Unterschleissheim (DE)

(73) Assignee: Magna Electronics Sweden AB, Vargarda (SE)

( * ) Notice: Subject to any disclaimer, the term of this patent is extended or adjusted under 35 U.S.C. 154(b) by 55 days.

(21) Appl. No.: 18/560,758

(22) PCT Filed: May 20, 2022

(86) PCT No.: PCT/EP2022/063741
§ 371 (c)(1),
(2) Date: Nov. 14, 2023

(87) PCT Pub. No.: WO2022/248357
PCT Pub. Date: Dec. 1, 2022

(65) Prior Publication Data
US 2024/0222853 A1 Jul. 4, 2024

(30) Foreign Application Priority Data
May 25, 2021 (EP) .................................... 21175664

(51) Int. Cl.
*H01Q 1/32* (2006.01)
*G01S 7/03* (2006.01)
(Continued)

(52) U.S. Cl.
CPC ........... *H01Q 1/3233* (2013.01); *G01S 7/032* (2013.01); *G01S 13/931* (2013.01); *H01Q 3/36* (2013.01)

(58) Field of Classification Search
CPC ...... H01Q 1/3233; H01Q 3/36; H01Q 1/2283; H01Q 3/24; H01Q 3/28; H01Q 13/206; G01S 7/032; G01S 13/931; G01S 13/426
See application file for complete search history.

(56) References Cited

U.S. PATENT DOCUMENTS

| | | | | | |
|---|---|---|---|---|---|
| 5,115,245 A | * | 5/1992 | Wen | .......................... | H01P 5/02 |
| | | | | | 342/175 |
| 9,880,262 B2 | | 1/2018 | Hayakawa | | |

(Continued)

FOREIGN PATENT DOCUMENTS

| | | | | | |
|---|---|---|---|---|---|
| JP | 2019012074 A | * | 1/2019 | ............. | G01S 13/22 |

OTHER PUBLICATIONS

International Search Report and Written Opinion of PCT/EP2022/063741, mailed Aug. 26, 2022.

*Primary Examiner* — Seung H Lee
(74) *Attorney, Agent, or Firm* — DICKINSON WRIGHT PLLC

(57) ABSTRACT

A vehicle radar sensor unit (2) having an antenna arrangement (3), a transceiver arrangement (4a, 4b, 4c, 4d) and a processing unit (6). The antenna arrangement (3) includes at least one transmitter array antenna (7) and at least two receiver antennas (24, 25, 26; 27, 28, 29; 30, 31, 32; 33, 34, 35), where each transmitter array antenna (7) have at least two sub-antennas (12, 13, 14, 15, 16, 17, 18, 19) that are vertically spaced from each other, where each sub-antenna (12, 13, 14, 15, 16, 17, 18, 19) have at least one antenna element (20, 21), and where each receiver antenna (24, 25, 26; 27, 28, 29; 30, 31, 32; 33, 34, 35) have a plurality of series fed antenna elements (22, 23) formed in a vertically extending column. Each sub-antenna (12, 13, 14, 15, 16, 17, 18, 19) is connected to the transceiver arrangement (4a, 4b, 4c, 4d) that is adapted to feed the corresponding sub-antenna (12, 13, 14, 15, 16, 17, 18, 19) with a controllable phase, (Continued)

such that each transmitter array antenna (7) is adapted to provide a transmitter antenna beam (36$_1$, 36$_2$) that is controllable in an elevation direction (40$_1$, 40$_2$).

14 Claims, 6 Drawing Sheets

(51) Int. Cl.
    *G01S 13/931*       (2020.01)
    *H01Q 3/36*        (2006.01)

(56)                References Cited

U.S. PATENT DOCUMENTS

| | | | |
|---|---|---|---|
| 10,684,354 B2 | 6/2020 | Brune et al. | |
| 10,809,370 B2 * | 10/2020 | Kim | G05D 1/0022 |
| 11,500,061 B2 * | 11/2022 | Loesch | G01S 13/931 |
| 11,579,287 B2 | 2/2023 | Tierney et al. | |
| 11,668,809 B2 * | 6/2023 | Lee | H01Q 3/26 |
| | | | 342/74 |
| 11,791,542 B2 | 10/2023 | Rieder | |
| 2015/0226838 A1 | 8/2015 | Hayakawa | |
| 2018/0156891 A1 | 6/2018 | Brune et al. | |
| 2020/0203824 A1 * | 6/2020 | You | H01Q 1/523 |
| 2020/0284901 A1 | 9/2020 | Tierney et al. | |
| 2020/0343626 A1 | 10/2020 | Rieder | |
| 2021/0296783 A1 * | 9/2021 | Rostomyan | H01Q 1/2283 |

* cited by examiner

S100
Providing transmitter antenna and receiver antennas

S200
Providing sub-antennas

S300
Providing antenna elements

S400
Providing a plurality of series fed antenna elements

S500
Feeding each sub-antenna with controllable phase

VEHICLE RADAR SENSOR UNIT WITH INCREASED VERTICAL RESOLUTION

CROSS-REFERENCE TO RELATED APPLICATIONS

This application is a 35 U.S.C. § 371 national phase of PCT International Application No. PCT/EP2022/063741, filed May 20, 2022, which claims the benefit of priority under 35 U.S.C. § 119 to European Patent Application No. EP 21175664.8, filed May 25, 2021, the contents of which are incorporated herein by reference in its entirety.

FIELD OF THE INVENTION

The present invention relates to a vehicle radar sensor unit comprising an antenna arrangement, a transceiver arrangement and a processing unit. The antenna arrangement comprises at least one transmitter array antenna and at least two receiver antennas.

BACKGROUND

Today, vehicle radar systems are arranged to detect objects in order to implement functions such as speed control and collision prevention, as well as others. With increasing demands on reliability, it is desired to distinguish unimportant obstacles like bridges and gantries from important objects on the road which are used for implementing said functions.

Although radars are good at detecting relevant objects in a majority of scenarios, in some scenarios, radars are limited and can fail to detect important targets. For example, when approaching a metal bridge or overhead sign, it is important that the radar is able to detect objects with low radar cross-sections (RCS) under the bridge. Similarly a radar system must be able to determine that an over-head sign can be safely driven under.

One approach to improving performance is to create a narrow transmitted antenna beam using a relatively high gain transmitter antenna, providing a relatively narrow beam in an elevation direction, but which still is wide in azimuth. An alternative approach is to create a null in the elevation pattern, where the null can be steered to the unwanted target.

Since a radar is not perfectly mounted on the vehicle, a typical installation tolerance being +/−3°, such a narrow beam in the elevation direction could be offset in an unde-sired manner. Also, if the vehicle is towing a trailer or has uneven loading, the beam may not be horizontal and could in fact be pointing upwards, for example towards an over-head target such as a bridge. It may be further preferable to avoid upwards pointing of the transmission beam to other reduce interference to other systems that use the same frequency band, for example radio astronomy sites that are often situated on mountain tops, or satellites.

It is at the same time desired to be able to be able to have a versatile radar detection as well as a possibility to align the transmitter antenna beam at startup.

There is thus a need for a vehicle radar sensor unit that enables versatile radar detections and also is arranged for separating targets at different positions in height.

SUMMARY

The above desirable features are achieved in accordance with this invention by a vehicle radar sensor unit comprising an antenna arrangement, a transceiver arrangement and a processing unit. The antenna arrangement comprises at least one transmitter array antenna and at least two receiver antennas, where each transmitter array antenna comprises at least two sub-antennas that are vertically spaced from each other. Each sub-antenna comprises at least one antenna element, and each receiver antenna comprises a plurality of series fed antenna elements formed in a vertically extending column. Each sub-antenna is connected to the transceiver arrangement that is adapted to feed the corresponding sub-antenna with a controllable phase, such that each transmitter array antenna is adapted to provide a transmitter antenna beam that is controllable in an elevation direction.

This means that the transmitter antenna beam can be directed in a plurality of elevation angles, both point-wise and in a continuous scanning manner, searching for target objects.

According to some aspects of embodiments of the present invention, the receiver antennas form at least one set of receiver antennas, each set comprising at least two receiver antennas, where at least two receiver antennas in at least one set are horizontally spaced from each other by means of corresponding receiver antenna horizontal distances.

This provides horizontally spaced receiver antennas.

According to some aspects of embodiments of the present invention, at least two receiver antennas in at least one set are vertically spaced from each other by means of a corre-sponding receiver antenna vertical distance.

According to some aspects of embodiments of the present invention, the antenna arrangement comprises at least two sets that are horizontally spaced from each other by means of a corresponding horizontal set distance.

According to some aspects of embodiments of the present invention, the antenna arrangement comprises at least two sets of receiver antennas that are vertically spaced from each other by means of a corresponding vertical set distance.

According to some aspects of embodiments of the present invention, at least two receiver antennas in at least one set are horizontally spaced from each other by means of mutu-ally different receiver antenna horizontal distances.

In this way, such a set constitutes a sparse receiver array antenna.

The above receiver antenna configurations, that can be combined in any suitable manner, enable different types of receiver antenna beams to be formed, and also enable the processing unit to determine elevation of the received signal, in addition to the transmitter antenna beam. This is benefi-cial in the case where the transmitter antenna beam has sidelobes that for example are about 15 dB below the main beam. This means that the areas outside the main beam will not be entirely masked and strong reflectors at other eleva-tion angles will still come through. Furthermore, elevation info derived by the receiver antenna beams may help to steer the transmitter antenna beam to deliver an optimized range performance.

According to some aspects of embodiments of the present invention, each receiver antenna is connected to the trans-ceiver arrangement, where each receiver antenna is adapted to provide a receiver antenna beam that has a main pointing direction.

The receiver antennas are thus controllable by means of the transceiver arrangement.

According to some aspects of embodiments of the present invention, at least one transmitter array antenna comprises at least one sub-antenna with at least two horizontally spaced antenna elements.

According to some aspects of embodiments of the present invention, the transceiver arrangement is adapted to feed the sub-antennas with a controllable signal amplitude. According to some further aspects, the transceiver arrangement is adapted to feed at least one sub-antenna with a signal amplitude that is zero.

This means that an amplitude taper is possible among the sub-antennas. By judicious choice of amplitude and phases to the transmitter array antenna, multiple simultaneous beams are possible, if desired.

Furthermore, the electrical size of the transmitter array antenna can be changed which will provide flexibility in usage. E.g. having just one, or a few, sub-antennas fed with a signal amplitude that exceeds zero will result in a relatively wide elevation beamwidth.

In other words, if it is desired to create a transmitter antenna beam that is relatively wide in elevation, a subset of the sub-antennas are fed with a signal and the others are left off. This would provide a wide transmitter antenna beam in elevation, while having a lower EIRP. It will be understood that such amplitude tapering across the length of the array of antennas may be beneficial for lowering sidelobe levels in the elevation plane.

A mid-sized transmitter antenna beam in elevation, for example using six out of a total of twelve sub-antennas, is beneficial when just starting out and not being sure that the transmitter antenna beam is correctly aligned to the horizon, or when driving in hilly terrain, or in environments where is desired to obtain knowledge about over-head such as low bridges.

According to some aspects of embodiments of the present invention, at least two sub-antennas are vertically spaced from each other by a vertical sub-antenna distance that lies between $1.3\lambda_T$ and $1.7\lambda_T$, where $\lambda_T$ is a wavelength corresponding to a transmitted signal center frequency, or a transmitter antenna design center frequency.

This will provide a sufficient control interval in elevation for the transmitter antenna beam.

According to some aspects of embodiments of the present invention, the transmitter array antenna and/or the receiver antennas are integrated into the transceiver arrangement.

This enables the use of antenna on package (AOP) where the antennas are integrated into the top of an MMIC (Monolithic Microwave Integrated Circuit).

This is also achieved by means of methods that are associated with the above advantages.

BRIEF DESCRIPTION OF THE DRAWINGS

The present disclosure will now be described more in detail with reference to the appended drawings, where.

DETAILED DESCRIPTION

Figure 1:
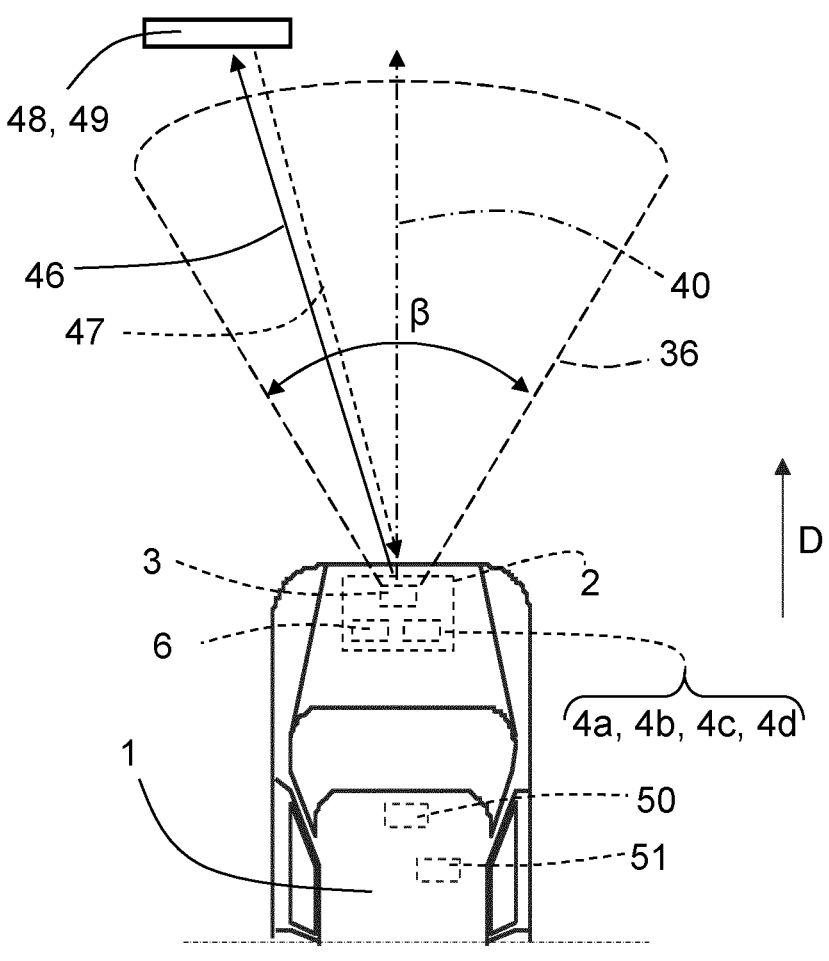
FIG. 1 shows a schematic top view of a vehicle with a radar sensor unit and a transmitter antenna beam.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

With reference to FIG. 1, a host vehicle 1 comprises a vehicle radar sensor unit 2 that in turn comprises an antenna arrangement 3, and a transceiver arrangement 4a, 4b, 4c, 4d, and a processing unit 6. The vehicle radar sensor unit 2 is according to some aspects arranged for generating and transmitting radar signals, that could be in the form of FMCW (Frequency Modulated Continuous Wave) chirp signals 46 of a previously known kind comprising a plurality of frequency ramps or PMCW comprising transmitting a carrier that has been modulated by a signal such as a pseudo-random binary sequence, and to receive reflected signals 47, where the transmitted chirp signals 46 have been reflected by a target object 48, 49.

Figure 3:
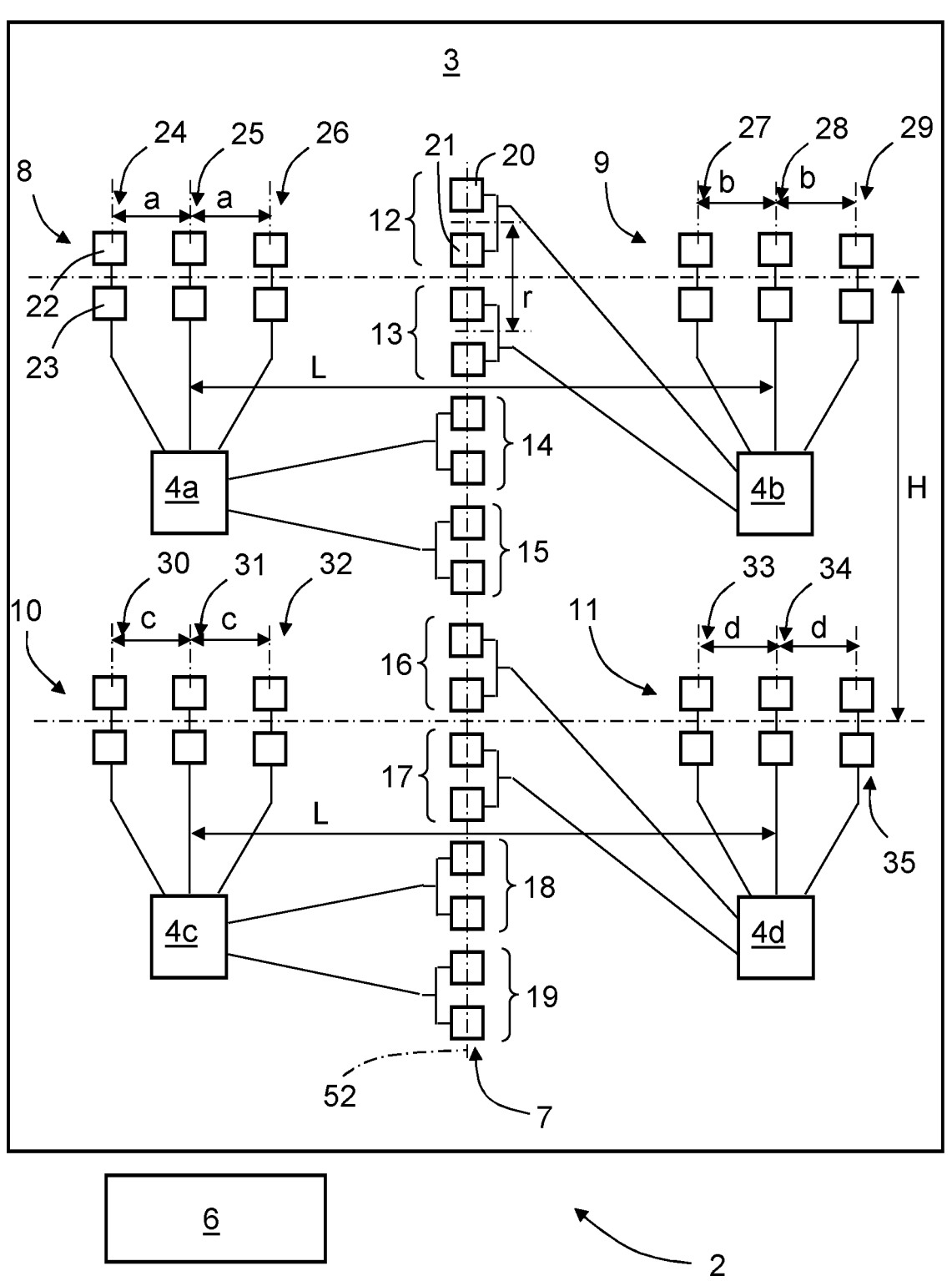
FIG. 3 shows a schematic representation of a radar sensor unit according to a first example.

With reference to FIG. 3, showing a first example, the antenna arrangement 3 comprises at least one transmitter array antenna 7 and at least two receiver antennas 24, 25, 26; 27, 28, 29; 30, 31, 32; 33, 34, 35 where each receiver antenna 24, 25, 26; 27, 28, 29; 30, 31, 32; 33, 34, 35 comprises a plurality of series fed antenna elements 22, 23 formed in a vertically extending column, in this example there are twelve receiver antennas 24, 25, 26; 27, 28, 29; 30, 31, 32; 33, 34, 35 each comprising two antenna elements 22, 23, shown in FIG. 3 as patch antenna elements. There may be any suitable number of antenna elements in each receiver antenna 24, 25, 26; 27, 28, 29; 30, 31, 32; 33, 34, 35, and this number can of course vary between the receiver antennas 24, 25, 26; 27, 28, 29; 30, 31, 32; 33, 34, 35.

Figure 2:
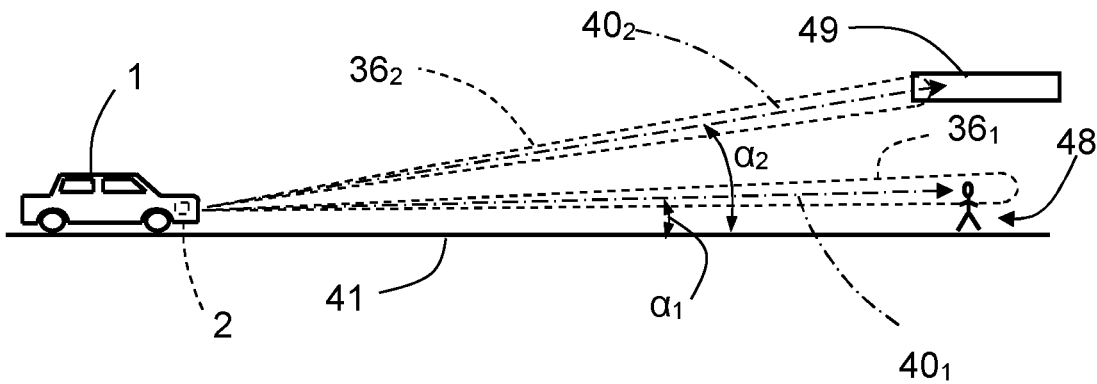
FIG. 2 shows a schematic side view of the vehicle and a transmitter antenna beam.

According to some aspects, the receiver antennas 24, 25, 26; 27, 28, 29; 30, 31, 32; 33, 34, 35 form at least one set 8, 9, 10, 11 of receiver antennas with at least two receiver antennas 24, 25, 26; 27, 28, 29; 30, 31, 32; 33, 34, 35 each. According to some aspects, as shown in FIG. 2, there are four sets 8, 9, 10, 11 of receiver antennas, each set comprising three receiver antennas 24, 25, 26; 27, 28, 29; 30, 31, 32; 33, 34, 35 each, but any other suitable configuration is of course conceivable.

According to some aspects, at least two receiver antennas 24, 25, 26; 27, 28, 29; 30, 31, 32; 33, 34, 35 in at least one set 8, 9, 10, 11 are horizontally spaced a, b, c, d from each other by corresponding receiver antenna horizontal distances a, b, c, d. Here, in a first set 8 the receiver antennas 24, 25, 26 are spaced by a first receiver antenna horizontal distance a, in a second set 9 the receiver antennas 27, 28, 29 are spaced by a second receiver antenna horizontal distance b, in a third set 10 the receiver antennas 30, 31, 32 are spaced by a third receiver antenna horizontal distance c, and in a fourth set 11 the receiver antennas 33, 34, 35 are spaced by a fourth receiver antenna horizontal distance d. The spacings, the receiver antenna horizontal distances, within a set is here shown to be the same, but can of course be different. The different receiver antenna horizontal distances a, b, c, d can be equal, or, alternatively, one or more can be mutually different.

These sets 8, 9, 10, 11 and the receiver antennas 24, 25, 26; 27, 28, 29; 30, 31, 32; 33, 34, 35 in the sets 8, 9, 10, 11 will be further discussed later.

The transmitter array antenna 7 comprises at least two sub-antennas 12, 13, 14, 15, 16, 17, 18, 19 that are vertically spaced from each other, where each sub-antenna 12, 13, 14, 15, 16, 17, 18, 19 comprises at least one antenna element 20, 21 (only indicated for one sub-antenna for reasons of clarity). In this example, there are eight sub-antennas 12, 13, 14, 15, 16, 17, 18, 19, where each sub-antenna 12, 13, 14, 15, 16, 17, 18, 19 comprises two antenna elements 20, 21. More than two antenna elements are of course conceivable for each sub-antenna, and there may be different numbers of antenna elements in different sub-antennas as will be discussed more later.

According to some aspects of embodiments of the present invention, the sub-antennas 12, 13, 14, 15, 16, 17, 18, 19 are symmetrically arranged along a vertically extending symmetry line 52.

According to the present disclosure, with reference also to FIG. 2, each sub-antenna 12, 13, 14, 15, 16, 17, 18, 19 is connected to the transceiver arrangement 4a, 4b, 4c, 4d that is adapted to feed the corresponding sub-antenna 12, 13, 14, 15, 16, 17, 18, 19 with a controllable phase, such that each transmitter array antenna 7 is adapted to provide a transmitter antenna beam 36, $36_1$, $36_2$ that is controllable in an elevation direction $\alpha_1$, $\alpha_2$. The elevation direction is defined as an elevation angle running between a reference such as a horizontal level 41 and a main pointing direction $40_1$, $40_2$.

This means that the transmitter antenna beam $36_1$, $36_2$ can be directed in several elevation angles $\alpha_1$, $\alpha_2$. In FIG. 2, showing an example, a first transmitter antenna beam $36_1$ is directed in a first main pointing direction $40_1$ at a first elevation angle $\alpha_1$ and is directed towards a pedestrian 48. A second transmitter antenna beam $36_2$ is some time later directed in a second main pointing direction $40_2$ at a second elevation angle $\alpha_2$ and is steered towards a bridge 49. The transmitter antenna beam 36 can be directed in a plurality of elevation angles, both point-wise and in a continuous scanning manner, searching for target objects.

As indicated in FIG. 3, according to some aspects, the transceiver arrangement 4a, 4b, 4c, 4d comprises separate transceiver units, in this example a first transceiver unit 4a, a second transceiver unit 4b, a third transceiver unit 4c and a fourth transceiver unit 4d. The transmitter array antenna 7 and/or the receiver antennas 24, 25, 26; 27, 28, 29; 30, 31, 32; 33, 34, 35 are integrated into the transceiver arrangement (4a, 4b 4c, 4) may according to some further aspects be integrated into the transceiver units 4a, 4b 4c, 4d, or may at least partly be separate from the antenna arrangement 3.

A first sub-antenna 12 and a second sub-antenna 13 are connected to the first transceiver unit 4a, a third sub-antenna 14 and a fourth sub-antenna 15 are connected to the second transceiver unit 4b, a fifth sub-antenna 16 and a sixth sub-antenna 17 are connected to the third transceiver unit 4c, and a seventh sub-antenna 18 and an eighth sub-antenna 19 are connected to the fourth transceiver unit 4d.

Figure 6:
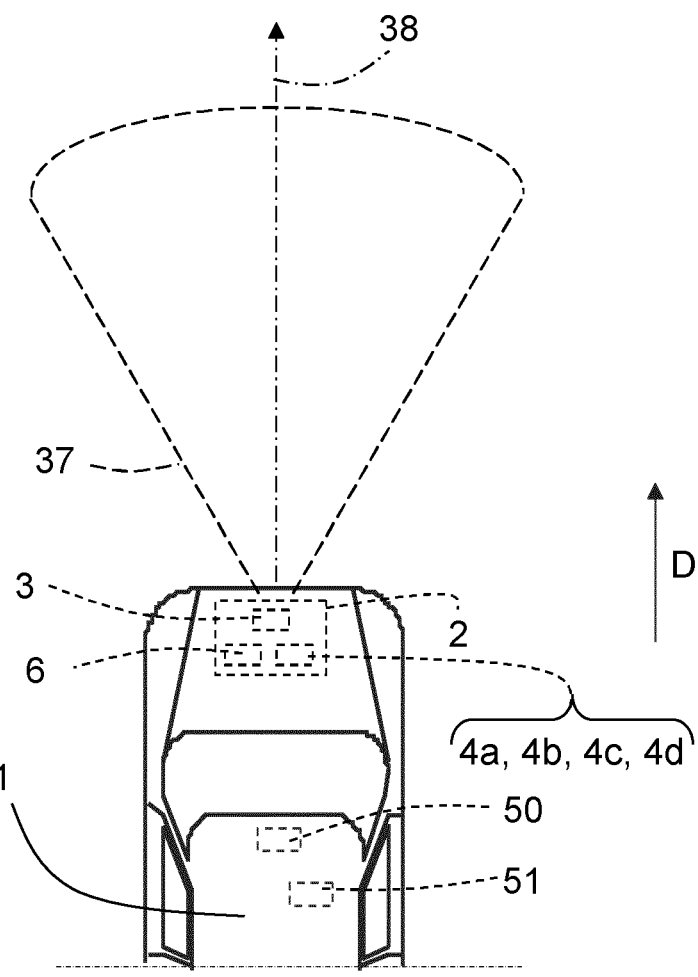
FIG. 6 shows a schematic top view of a vehicle with the radar sensor unit and a receiver antenna beam.

According to some aspects of embodiments of the present invention, each receiver antenna 24, 25, 26; 27, 28, 29; 30, 31, 32; 33, 34, 35 is connected to the transceiver arrangement 4a, 4b, 4c, 4d, where each receiver antenna 24, 25, 26; 27, 28, 29; 30, 31, 32; 33, 34, 35 is adapted to provide a receiver antenna beam 37 that has a main pointing direction 38 as illustrated in FIG. 6. According to some aspects, in a manner similar to the one described for the transmitter array antenna 7, the receiver antennas 24, 25, 26; 27, 28, 29; 30, 31, 32; 33, 34, 35 are connected to the transceiver units 4a, 4b, 4c, 4d that are comprised in the transceiver arrangement 4a, 4b, 4c, 4d.

Such connections can be made in many ways, in this example the first set 8 is connected to the first transceiver unit 4a, the second set 9 is connected to the second transceiver unit 4b, the third set 10 is connected to the third transceiver unit 4c, and the fourth set 11 is connected to the fourth transceiver unit 4d.

The receiver antenna horizontal distances a, b, c, d can be the same, alternatively one or more can be mutually different. According to some aspects, as illustrated for the first set 8' in FIG. 4 that illustrates a second example with an alternative antenna arrangement 3', the horizontal distance between at least two receiver antennas 24, 25, 26 in at least one set 8' can be separated by mutually different receiver antenna horizontal distances a, a'. According to some aspects, both antenna horizontal distances a, a' exceed a half wavelength, $0.5\lambda_r$, where $\lambda_r$ is a wavelength corresponding to a received signal center frequency, or a receiver antenna design center frequency. In this way, such a set 8' constitutes a sparse receiver array antenna.

Figure 4:
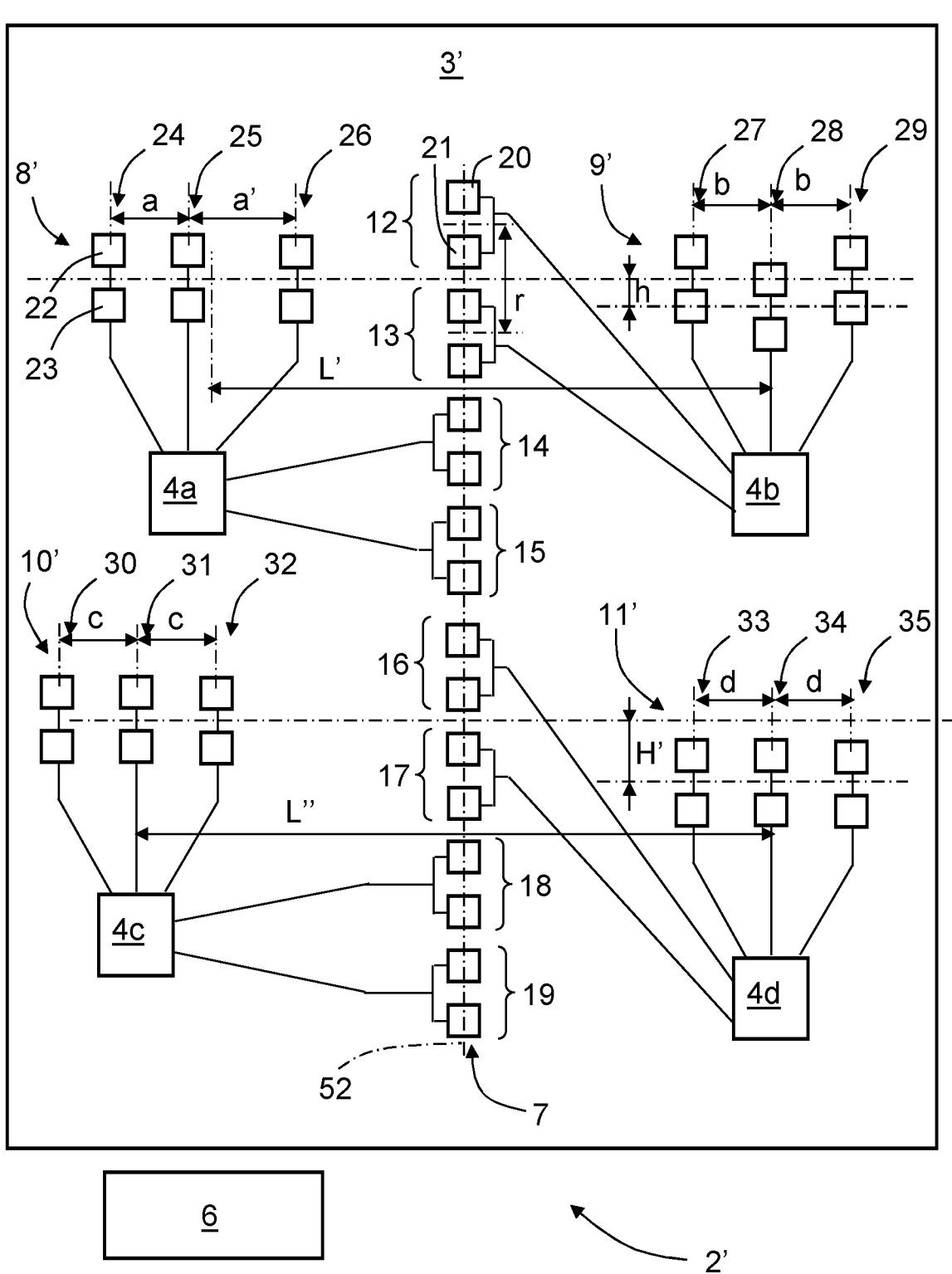
FIG. 4 shows a schematic representation of a radar sensor unit according to a second example.

With continued reference to FIG. 4, according to some aspects, at least two receiver antennas 27, 29; 28 in at least one set 9' are vertically spaced h from each other by means of a corresponding receiver antenna vertical distance h, as illustrated for the second set 9'. A receiver antenna vertical distance h thus vertically separates at least one receiver antenna 28 from the other receiver antennas 27, 29.

According to some aspects of embodiments of the present invention, the antenna arrangement 3 comprises at least two sets 8, 9; 10, 11; 8', 9'; 10', 11' that are horizontally spaced L, L', L" from each other by means of a corresponding horizontal set distance L, L', L". In FIG. 3, this is illustrated for the first set 8 and the second set 9 that are horizontally separated by a first horizontal set distance L, and where the third set 10 and the fourth set 11 also are horizontally separated by the first horizontal set distance L. In FIG. 4, the first set 8' and the second set 9' are horizontally separated by a second horizontal set distance L' and the third set 10' and the fourth set 11' are horizontally separated by a third horizontal set distance L", where the second horizontal set distance L' and the third horizontal set distance L" are mutually different.

According to some aspects of embodiments of the present invention, the antenna arrangement 3 comprises at least two sets of receiver antennas 9, 11; 10', 11' that are vertically spaced H, H' from each other by means of a corresponding vertical set distance H, H'. This is illustrated in FIG. 3, where the first set 8 and the second set 9 share the same vertical position while being horizontally separated by the first horizontal set distance L, and where the third set 10 and the fourth set 11 share the same vertical position while being horizontally separated by the first horizontal set distance L. Furthermore, on one hand, the first set 8 and the second set 9, and on the other hand, the third set 10 and the fourth set 11 are separated by a first vertical set distance H.

A similar setup is shown in FIG. 4, here, however, the third set 10' and the fourth set 11' do not share the same vertical position but are mutually displaced by a second vertical set distance H' that constitutes a displacement distance.

The examples above can of course be combined in different ways such that the sets 8, 9, 10, 11; 8', 9', 10', 11' and their receiver antennas can be distributed in any suitable manner. This enables different types of receiver antenna beams 37 to be formed, and also enables the processing unit 6 to determine elevation of the received signal, in addition to the transmitter antenna beam 36. This is beneficial in the case where the transmitter antenna beam 36 has sidelobes that for example are about 15 dB below the main beam. This means that the areas outside the main beam will not be entirely masked and strong reflectors at other elevation angles will still come through. Furthermore, elevation info derived by means of the receiver antenna beams 37 may help to steer the transmitter antenna beam 36 to deliver an optimized range performance.

The transmitter array antenna 7 has been described to be a linear array antenna with linearly arranged antenna elements 20, 21, forming sub-antennas 12, 13, 14, 15, 16, 17, 18, 19 in one dimension.

Figure 5:
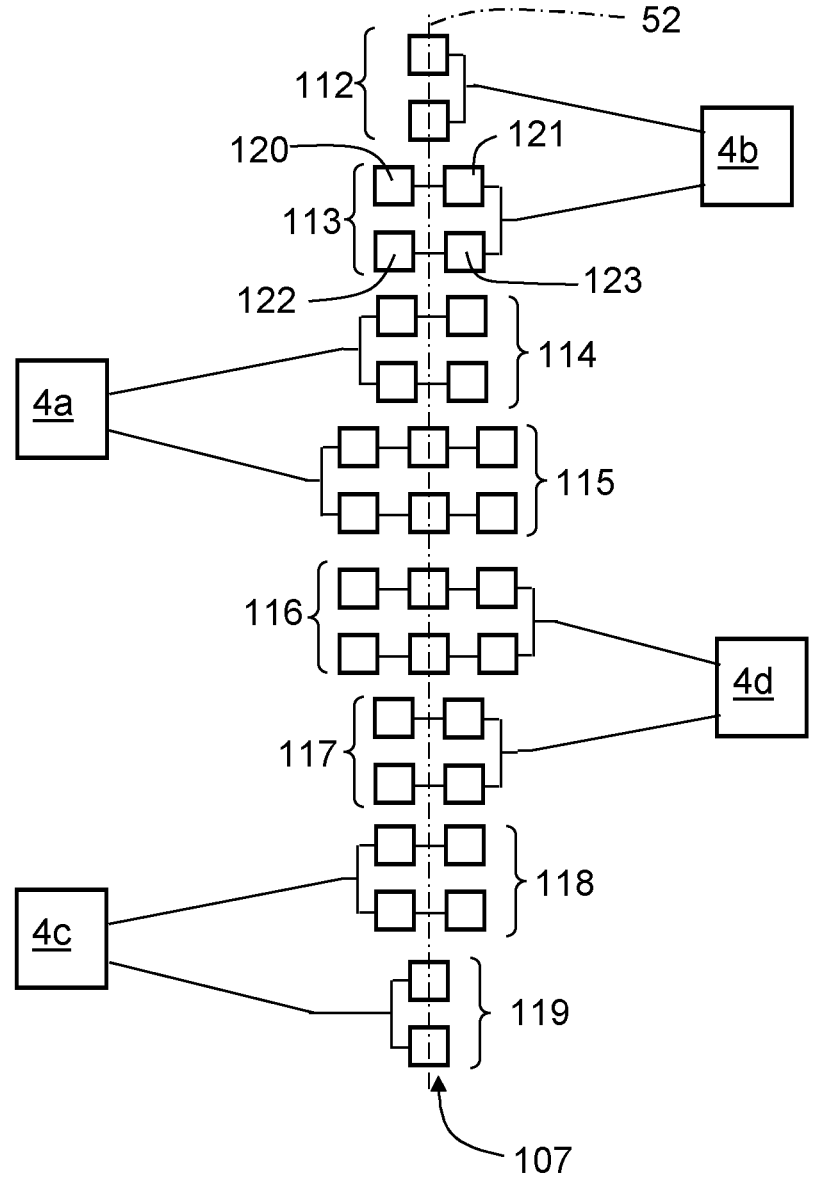
FIG. 5 shows a schematic representation of an alternative transmitter array antenna.

According to some aspects, other types of transmitter array antennas are possible, and an example of an alternative transmitter array antenna 107 is shown in FIG. 5. Here, for reasons of clarity, only the transmitter array antenna 107 and the transceiver arrangement 4a, 4b, 4c, 4d are shown, not the whole antenna arrangement. It is to be appreciated that the alternative transmitter array antenna 107 presented here is comprised in an antenna arrangement with receiver antennas of the types discussed above.

There are still eight sub-antennas 112, 113, 114, 115, 116, 117, 118, 119 that are vertically spaced from each other, where there are different numbers of antenna elements 120, 121, 122, 123 (only indicated for one sub-antenna 113 for reasons of clarity) in different sub-antennas 112, 113, 114, 115, 116, 117, 118, 119.

In a first sub-antenna 112 and eighth sub-antenna 119 there are two vertically stacked antenna elements, each sub-antenna 112, 119 forming a one-dimensional 1×2 (columns×rows) array. In a second sub-antenna 113, third sub-antenna 114, sixth sub-antenna 117 and seventh sub-antenna 118 there are two vertically stacked antenna elements in two columns, each sub-antenna forming a two-dimensional 2×2 array. In a fourth sub-antenna 115 and fifth sub-antenna 116 there are two vertically stacked antenna elements in three columns, each sub-antenna forming a two-dimensional 3×2 array.

The two-dimensional sub-antenna arrays that are comprised in the transmitter array antenna 107 can have any suitable configuration, the one presented above only being one example among many possibilities. Generally, at least one transmitter array antenna 107 comprises at least one sub-antenna 113, 114, 115, 116, 117, 118 with at least two horizontally spaced antenna elements 120, 121; 122, 123. According to some aspects, the antenna elements 120, 121, 122, 123 in each sub-antenna 113, 114, 115, 116, 117, 118 are fed in phase. For all examples, there can be any suitable number of sub-antennas, but at least two.

Each sub-antenna 112, 113, 114, 115, 116, 117, 118, 119 is connected to the transceiver arrangement 4a, 4b, 4c, 4d as described previously, where the transceiver arrangement 4a, 4b, 4c, 4d is adapted to feed the corresponding sub-antenna 112, 113, 114, 115, 116, 117, 118, 119 with a controllable phase, such that the transmitter array antenna 107 is adapted to provide a transmitter antenna beam 36, $36_1$, $36_2$ that is controllable in an elevation direction $\alpha_1$, $\alpha_2$ as shown in FIG. 2, in the same manner as described previously with reference to FIG. 2-4.

For all examples, according to some aspects of embodiments of the present invention, the transceiver arrangement 4a, 4b, 4c, 4d is adapted to feed the sub-antennas 12, 13, 14, 15, 16, 17, 18, 19; 112, 113, 114, 115, 116, 117, 118, 119 with a controllable signal amplitude. This means that an amplitude taper is possible among the sub-antennas 12, 13, 14, 15, 16, 17, 18, 19; 112, 113, 114, 115, 116, 117, 118, 119. By judicious choice of amplitude and phases to the transmitter array antenna 7, multiple simultaneous beams are possible, if desired.

According to some further aspects of embodiments of the present invention, the transceiver arrangement 4a, 4b, 4c, 4d is adapted to feed at least one sub-antenna 12, 13, 14, 15, 16, 17, 18, 19; 112, 113, 114, 115, 116, 117, 118, 119 with a signal amplitude that is zero.

In this way, the electrical size of the transmitter array antenna 7, 107 can be changed which will provide flexibility in usage. E.g. having just one, or a few, sub-antennas 12, 13, 14, 15, 16, 17, 18, 19; 112, 113, 114, 115, 116, 117, 118, 119 fed with a signal amplitude that exceeds zero will result in a relatively wide elevation beamwidth.

This means that if it is desired to create a transmitter antenna beam 36 that is wide in elevation, a subset of the sub-antennas 12, 13, 14, 15, 16, 17, 18, 19; 112, 113, 114, 115, 116, 117, 118, 119 are fed with a signal and the others are left off. This would provide a wide transmitter antenna beam 36 in elevation, while having a lower EIRP (Equivalent isotropically radiated power). It will be understood that such amplitude tapering across the length of the array of antennas may be beneficial for lowering sidelobe levels in the elevation plane.

A mid-sized transmitter antenna beam 36 in elevation, for example using four of the eight sub-antennas 12, 13, 14, 15, 16, 17, 18, 19; 112, 113, 114, 115, 116, 117, 118, 119, could sometimes be preferable, e.g. when just starting out and not being sure that the transmitter antenna beam 36 is correctly aligned to the horizon, or when driving in hilly terrain, or in environments where is desired to obtain knowledge about over-head such as low bridges.

Digital control of the amplitude of the signal at the input to each antenna can be lowered to comply with specific country regulations if necessary.

An irregular transmitter array antenna 107 according to the above that comprises at least one sub-antenna 113, 114, 115, 116, 117, 118 with at least two horizontally spaced antenna elements 120, 121; 122, 123, different antenna patterns can be selected by using only one or a few of the sub-antennas 112, 113, 114, 115, 116, 117, 118, 119, for example a transmitter antenna beam 36 that has a relatively wide azimuth beamwidth, for example an outer sub-antenna 113, or a relatively narrow azimuth beamwidth but with a higher gain, for example a combination of some central sub-antennas 114, 115, 116, 117. Also, such inherent amplitude weighting helps reduce sidelobes in the elevation domain.

A combination is also conceivable, where for example one sub-antenna is driven isolated from the others, generating a relatively wide beamwidth in elevation while the other sub-antennas are driven together to form a relatively narrow beamwidth, where that beam is controllable in an elevation direction $40_1$, $40_2$.

According to some aspects of embodiments of the present invention, at least two sub-antennas 12, 13, 14, 15, 16, 17, 18, 19 are vertically spaced from each other by a vertical sub-antenna distance r, indicated in FIG. 3 and FIG. 4, which according to some further aspects lies between $1.3\lambda_T$ and $1.7\lambda_T$, where $\lambda_T$ is a wavelength corresponding to a transmitted signal center frequency, or a transmitter antenna design center frequency.

This will provide a sufficient control interval in elevation for the transmitter antenna beam 36.

According to some aspects of embodiments of the present invention, the processing unit 6 is adapted to receive input regarding a host vehicle inclination relative horizontal ground and to control the transceiver arrangement 4a, 4b, 4c, 4d to feed the corresponding sub-antenna 12, 13, 14, 15, 16, 17, 18, 19 with a certain set of phases and amplitudes in dependence of said input.

According to other aspects of embodiments of the present invention, the processing unit 6 may receive input that indicates a preferred transmission beam pattern and/or direction, where such input may be transferred from another control unit such as a safety control unit 50 as indicated in FIG. 1, or another central control unit. The input may further indicate a suspicious target object at which the transmitter antenna beam should be focused, while more radar processing resources are diverted towards identifying or validating the presence of the object. The processing is either at least partly performed at the processing unit 6 or at another processing unit.

This means that the vehicle radar sensor unit can be adapted to always seek out the best elevation angle $\alpha_1$, $\alpha_2$ for the transmitter antenna beam 36 when driving. Further, the transmitter antenna beam 36 may be scanned up or down for many different elevation angles $\alpha_1$, $\alpha_2$ to confirm presence of bridge 49, overhead signs, or to investigate the road surface in more detail, e.g. detect pot-hole or icy road surface.

The antenna elements are schematically indicated as linear microstrip patch antennas that can form linear patch antenna arrays, but other antenna configurations are of course possible, such as for example dipole antennas or slot antennas. Only a few antenna elements 20, 21 are indicated for reasons of clarity.

According to some aspects of embodiments of the present invention, the antenna elements in one or more sub-antennas are fed in phase. According to some aspects, the feeding line distance between the transceiver arrangement 4a, 4b, 4c, 4d and each corresponding antenna element should be kept at the same length, in this way the antenna performance is maintained consistent over temperature.

The antenna elements have been illustrated to be of linear single polarization, where such a single polarization can be vertical polarization, horizontal polarization, or slanted 45° polarization. According to some aspects, the antenna elements are instead dual polarized, and the present disclosure is consequently applied to both polarizations. Alternatively, circular polarization is also conceivable.

Figure 7:
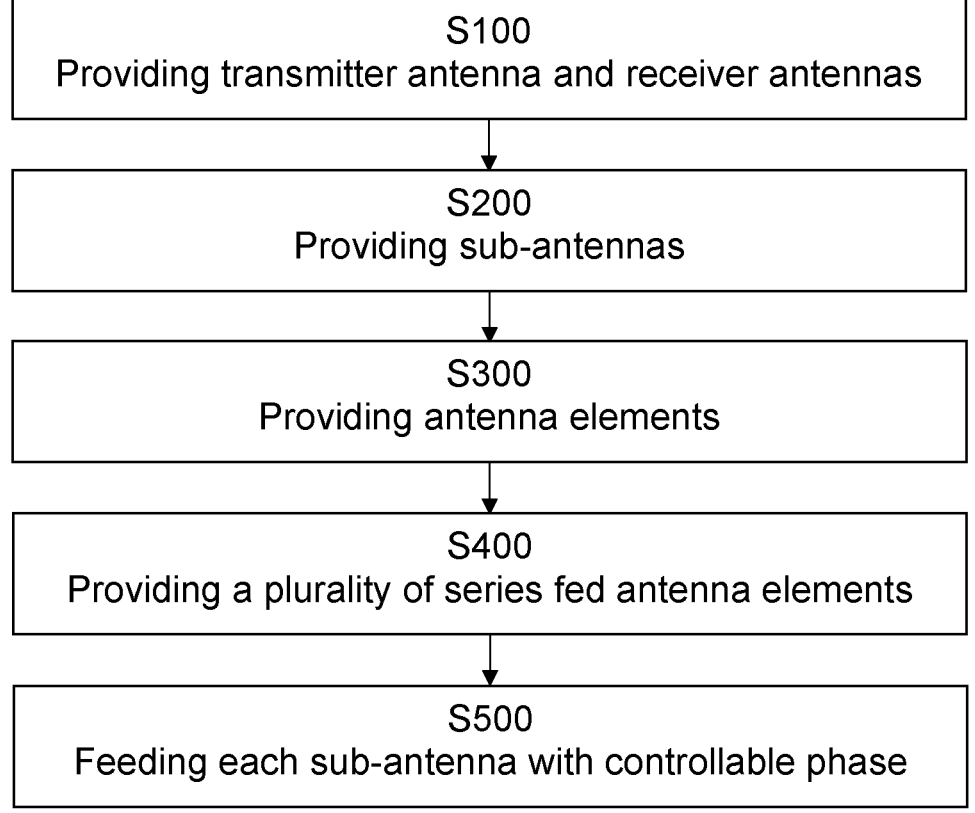
FIG. 7 shows a flowchart for methods according to the present disclosure.

With reference to FIG. 7, the present disclosure also relates to a method for a vehicle radar sensor unit 2. The method comprises providing at step S100 at least one transmitter array antenna 7 and at least two receiver antennas 24, 25, 26; 27, 28, 29; 30, 31, 32; 33, 34, 35, and providing at step S200 at least two sub-antennas 12, 13, 14, 15, 16, 17, 18, 19 that are vertically spaced from each other for each transmitter array antenna 7. The method further comprises providing at step S300 at least one antenna element 20, 21 for each sub-antenna 12, 13, 14, 15, 16, 17, 18, 19, and providing at step S400 a plurality of series fed antenna elements 22, 23 formed in a column for each receiver antenna 24, 25, 26; 27, 28, 29; 30, 31, 32; 33, 34, 35. The method further comprises feeding at step S500 each sub-antenna 12, 13, 14, 15, 16, 17, 18, 19 with a controllable phase such that each transmitter array antenna 7 is used for providing transmitter antenna beam $36_1$, $36_2$ that is controllable in an elevation direction $40_1$, $40_2$.

The present disclosure is not limited to the examples above, but may vary freely within the scope of the appended claims. For example, the microwave parts of the radar sensor arrangement 3 are assumed to be of a previously known design, and according to some aspects the radar sensor arrangement 3 comprises more parts than shown, and is for example connected to a warning and/or information device comprised in the vehicle 1 in a previously known manner.

The calculations and determining procedures are performed by the processing unit 6, where the processing unit 6 should be regarded as a processing unit arrangement that is in the form of one unit or several units that either co-operate or handle different tasks more or less independently. In the case of several units, these may be placed adjacent to each other, or in a distributed manner. According to some aspects, the processing unit 6 can be a central processing unit that is shared between several sensor units, and possibly also other vehicle systems.

The transceiver arrangement 4a, 4b, 4c, 4d may be constituted by one unit or several separate units that can be in the form of MMICs (Monolithic microwave integrated circuits). The transceiver arrangement 4a, 4b, 4c, 4d comprises controllable phase shifters and amplifiers which are previously well-known, and can according to some aspects be integrated into the antenna arrangement.

All details given in the example are of course only given as an illustration of the present disclosure, and should not be regarded as limiting in any way.

There may be more or less than the four sets 8, 9, 10, 11 of receiver antennas 24, 25, 26; 27, 28, 29; 30, 31, 32; 33, 34, 35 described. The number of receiver antennas in each set of receiver antennas may vary from set to set, and the number of antenna elements in each receiver antenna, and their mutual distance, may vary.

There may be one or more transmitter array antennas, where each transmitter array antenna is constituted by one of more sub-antennas that comprise one or more antenna elements each. Antenna element separation as well as sub-antenna separation may vary.

The radar signal can be of any suitable kind, for FMCW chirp signals having any suitable frequency ramp configuration, for example saw-tooth signals and down-ramps where. Generally, the vehicle radar sensor unit 2 is arranged to transmit any sort of TDM (Time Division Multiplexed) signals, such as for example FMCW signals.

As indicated in FIG. 1, the vehicle 1 comprises a safety control unit 50 and safety means 51, for example an emergency braking system and/or an alarm signal device. The safety control unit 50 is arranged to control the safety means 51 in dependence of input from the radar sensor unit 2. Such input may be input via the processing unit 6.

When different antennas, sub-antennas and sets of antennas are spaced by defined distances and spacings, these distances and spacings are measured between corresponding phase centers.

According to some aspects, the processing unit 6 can be a central processing unit that is shared between several sensor units, and possibly also other vehicle systems.

According to some aspects of embodiments of the present invention, a resulting receiver antenna beam pattern is determined by the attributes of the receiver antennas, which have relatively wide azimuth patterns. Relatively narrow azimuth beams are created by means of digital signal processing, such as digital beamforming, which can be performed by the processing unit 6 or any other suitable processing unit. This enables the direction to a target object to be determined in the form of one or more detections, such that target objects of particular attention and arrival direction can be determined in previously well-known ways, for example using FFT/Bartlett based beamforming or a super-resolution technique such as MUSIC (Multiple Signal Classification) or Capon. The parameters making up the transmission beam, for example the present elevation angle $\alpha_1$, $\alpha_2$, may be updated as a result of the information contained within the one or more detections.

According to some aspects of embodiments of the present invention, the transceiver arrangement 4a, 4b, 4c, 4d can be shared between the at least one transmitter array antenna 7 and the at least two receiver antennas 24, 25, 26; 27, 28, 29; 30, 31, 32; 33, 34, 35.

According to some aspects of embodiments of the present invention, terms such as vertical, horizontal, azimuth and elevation are well-known in this technical field, and should be interpreted accordingly and to be within practical limits, not being intended to be mathematically exact.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar sensor unit comprising an antenna arrangement, a transceiver arrangement and a processing unit, where the antenna arrangement comprises at least one transmitter array antenna and at least two receiver antennas, where each of the at least one transmitter array antenna comprises at least two sub-antennas that are vertically spaced from each other, where each of the at least two sub-antennas comprises at least one antenna element, and where each of the at least two receiver comprises a plurality of series fed antenna elements formed in a vertically extending column, wherein each of the at least two sub-antennas is connected to the transceiver arrangement that is adapted to feed a corresponding sub-antenna of the at least two sub-antennas with a controllable phase, such that each of the at least one transmitter array antenna is adapted to provide a transmitter antenna beam that is controllable in an elevation direction, wherein adjacent ones of the at least two sub-antennas are-vertically spaced from each other by a vertical sub-antenna distance that lies between $1,3\lambda_T$ and $1,7\lambda_T$, where $\lambda_T$ is a wavelength corresponding to a transmitted signal center frequency, or a transmitter antenna design center frequency.

2. The vehicle radar sensor unit according to claim 1, wherein the of the at least two receiver antennas form at least one set of receiver antennas, each of the at least one set comprising the at least two receiver antennas where the at least two receiver antennas in the at least one set are horizontally spaced from each other by corresponding receiver antenna horizontal distances.

3. The vehicle radar sensor unit according to claim 2, wherein the at least two receiver antennas in the at least one set are vertically spaced from each other by a corresponding receiver antenna vertical distance.

4. The vehicle radar sensor unit according to claim 2, wherein the antenna arrangement comprises at least two sets that are horizontally spaced from each other by a corresponding horizontal set distance.

5. The vehicle radar sensor unit according to claim 2, wherein the antenna arrangement comprises at least two sets of the at least two receiver antennas that are vertically spaced from each other by a corresponding vertical set distance.

6. The vehicle radar sensor unit according to claim 2, wherein the at least two receiver antennas in the at least one set are horizontally spaced from each other by mutually different receiver antenna horizontal distances.

7. The vehicle radar sensor unit according to claim 1, wherein each of the at least two receiver antennas connected to the transceiver arrangement, where each of the at least two receiver antennas is adapted to provide a receiver antenna beam that has a main pointing direction.

8. The vehicle radar sensor unit according to claim 1, wherein the transceiver arrangement is adapted to feed the at least two sub-antennas with a controllable signal amplitude.

9. The vehicle radar sensor unit according to claim 8, wherein the transceiver arrangement is adapted to feed at least one of the at least two sub-antennas with a signal amplitude that is zero.

10. The vehicle radar sensor unit according to claim 1, wherein the at least one transmitter array antenna comprises at least one of the sub-antennas with at least two horizontally spaced antenna elements.

11. The vehicle radar sensor unit according to claim 1, wherein the processing unit is adapted to receive an input regarding a host vehicle inclination relative to a horizontal ground and to control the transceiver arrangement to feed the corresponding sub-antenna of the at least two sub-antennas with a certain phase in dependence of the input.

12. The vehicle radar sensor unit according to claim 1, wherein the at least two sub-antennas are symmetrically arranged along a vertically extending symmetry line.

13. The vehicle radar sensor unit according to claim 1, wherein the of the at least one transmitter array antennas or the at least two receiver antennas are integrated into the transceiver arrangement.

14. A method for a vehicle radar sensor unit, where the method comprises the steps of:

providing at least one transmitter array antenna and at least two receiver antennas;

providing at least two sub-antennas that are vertically spaced from each other for each of the at least one transmitter array antenna;

providing at least one antenna element for each of the at least two sub-antennas; and providing a plurality of series fed antenna elements formed in a column for each of the at least two receiver antennas;

feeding each of the at least two sub-antennas with a controllable phase such that each of the at least one transmitter array antenna is used for providing a transmitter antenna beam that is controllable in an elevation direction, wherein adjacent ones of the at least two sub-antennas are-vertically spaced from each other by a vertical sub-antenna distance that lies between $1,3\lambda_T$ and $1,7\lambda_T$, where $\lambda_T$ is a wavelength corresponding to a transmitted signal center frequency, or a transmitter antenna design center frequency.

* * * * *